United States Patent [19]

Osborne

[11] 4,228,876
[45] Oct. 21, 1980

[54] INTERNAL SHOE DRUM BRAKES

[75] Inventor: Duncan W. Osborne, Leamington Spa, England

[73] Assignee: Automotive Products Limited, Leamington Spa, England

[21] Appl. No.: 14,990

[22] Filed: Feb. 26, 1979

[30] Foreign Application Priority Data

Feb. 28, 1978 [GB] United Kingdom ............... 07835/78

[51] Int. Cl.³ .............................................. F16D 51/00
[52] U.S. Cl. ......................... 188/79.5 GT; 188/196 P; 188/216
[58] Field of Search .................. 188/79.5 GT, 79.5 P, 188/196 P, 216

[56] References Cited

U.S. PATENT DOCUMENTS

| 2,228,576 | 1/1941 | Marino | 188/79.5 GT |
| 2,875,860 | 3/1959 | Eckardt et al. | 188/79.5 GT |
| 3,057,439 | 10/1962 | House et al. | 188/79.5 GT |

Primary Examiner—Douglas C. Butler
Attorney, Agent, or Firm—Kemon & Estabrook

[57] ABSTRACT

The invention relates to internal shoe drum brakes having an automatic adjuster to maintain a substantially constant clearance between the brake shoes and the drum, when the brakes are released. A strut having a variable overall effective length acts between the shoes for automatic adjustment of the clearance and has one end portion connected to one brake shoe through a lost motion device. The lost motion device comprises a main lost motion connection for providing a minimum clearance and a secondary lost motion connection which provides a greater clearance for de-adjusting the brake, and a first spring acts to ensure that for normal service conditions the lost motion device acts through the main connection and the bias of this spring is overcome by manual operative device before the secondary connection becomes operable.

7 Claims, 2 Drawing Figures

INTERNAL SHOE DRUM BRAKES

This invention relates to motor vehicle internal shoe drum brakes which are fitted with automatic adjusters and provides a method of de-adjusting such brakes so as to facilitate removal of the brake drum.

Internal shoe drum brake commonly include two brake shoes each provided with a friction lining and an automatic adjusting device for maintaining a substantially constant clearance between the friction lining and the internal surface of the drum. It is well known for adjusters of this type to utilise a strut extending between the two shoes. The strut acts between both shoes and is arranged to increase its overall effective length as the friction lining wears, so as to maintain substantially contact clearance. In order to remove the brake drum for routine servicing of the brake, it is necessary to increase the clearance between the brake linings and the drum since with automatic adjusters this clearance is kept particularly small and any score marks on the drum may well form undercuts with the lining material.

This invention provides a method of increasing the service clearance between the brake linings and drum so as to allow, the brake drum to be more easily removed, that is a method of de-adjusting the brake.

According to the invention there is provided an internal shoe drum brake including a pair of brake shoes with a strut having variable overall effective length acting between the shoes for automatic adjustment of clearance between brake shoes and the brake drum when the brakes are released, one end portion of the strut being connected to one brake shoe through a lost motion means which provides a minimum clearance between the brake shoes and the drum, wherein the lost motion means comprises a main lost motion connection for providing said clearance for normal service braking and a secondary lost motion connection which provides a greater clearance than the first connection for de-adjusting the brake, and a first spring acts to ensure that for normal service braking the lost motion means acts through the main connection and the bias of the first spring is overcome by manual operative means before the secondary connection becomes operable.

Conveniently the lost motion means comprises a stepped rivet attached to either of the strut or shoe and having two different diameter portions engageable with a clearance hole in the other of the strut or shoe and the first spring acts against the shoe or strut to bias the larger diameter portion of the rivet into engagement with the clearance hole and form the main connection.

Conveniently the rivet is secured on the strut and the clearance hole is in the shoe.

Preferably the other end portion of the strut is connected to the other brake shoe through friction grip device and a spring acts between the one brake shoe and the strut so as to bias the strut towards the one shoe without acting through the friction grip device.

The invention will be described by way of example and with reference to the following drawings in which.

Figure 1:
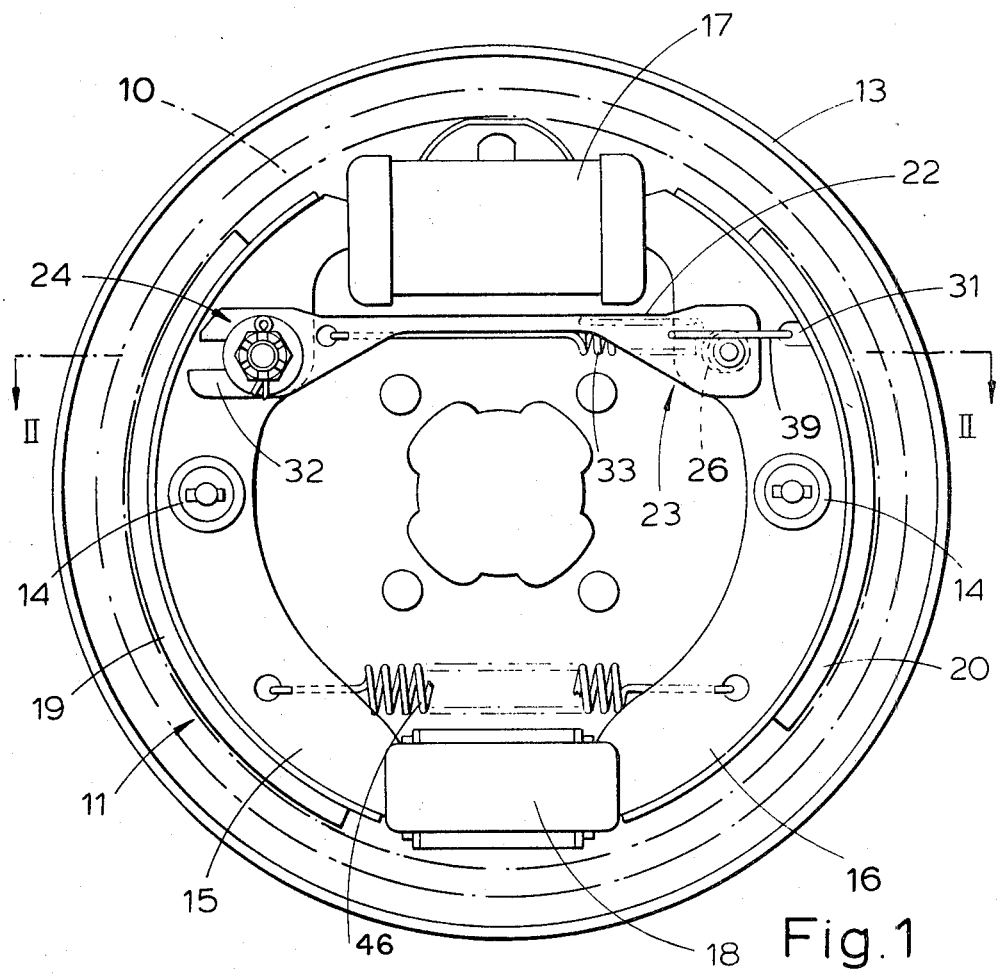
FIG. 1 shows an internal shoe drum brake according to this invention.
Figure 2:
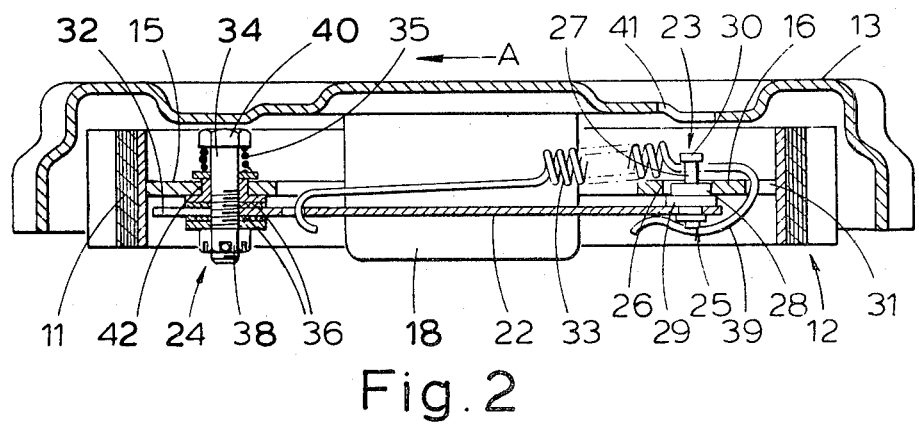
FIG. 2 is a section on the line II—II of FIG. 1.

The workings of the drum brake will be explained sufficiently so that the working of the invention will be understood, the drum brake as illustrated in FIG. 1 and FIG. 2 being illustrated without the drum being fitted, the drum 10 being shown by dotted lines only in FIG. 1.

The drum brake assembly comprises a pair of arcuate brake shoes 11 and 12 mounted on a stationary back plate 13. Each brake shoe 11 and 12 is restrained from moving away from the back plate 13 by a respective spring loaded retainer 14 acting between the back plate 13 and the respective web 15 and 16 of each shoe 11 and 12.

The two brake shoes 11 and 12 are arranged such that a double ended hydraulic cylinder assembly 17 acts between one pair of adjacent ends of the brake shoes and the other pair of adjacent ends pivot about an abutment 18 secured to the back plate 13. The abutment 18 will take some of the torque load when the brakes are applied. The hydraulic cylinder 17 is also secured to the back plate 13 and when the brakes are applied, operates to separate the one pair of adjacent ends so as to thrust the friction linings 19 and 20 fitted to the brake shoes 11 and 12 respectively against the internal circumferential surface of a revolving drum (not shown).

A strut 22 formed from sheet steel extends between the one end portions of the webs 15 and 16 adjacent the hydraulic cylinder 17. One end portion of the strut 22 is connected to one brake shoe 12 through lost motion means 23 and the other end portion of the strut 22 is connected to the web 15 of the other brake shoe 11 by a friction grip device 24.

The lost motion means 23 comprises a stepped rivet 25 secured to the one end portion of the strut 22 and accommodated within a clearance hole 26 in the web 16 of the one brake shoe 12. The rivet 25 has three progressively stepped different diameter portions, a smallest diameter portion 27 which when received in the hole 26 forms a secondary lost motion connection, a medium diameter portion 28 which when received in the hole 26 will form a main lost motion connection and a largest diameter portion 29 adjacent the strut 22, which will abut the web 16 and which cannot be accommodated by the hole 26. The rivet has a head 30 attached to the end of the smaller diameter portion 27.

The clearance hole 26 has dimensions such that it provides a clearance for the medium diameter portion 28 in a direction substantially parallel with the strut 22 allowing some freedom of movement of the strut towards and from the other brake shoe 11. A spring 33 acts between the strut 22 and the web 16 of the one brake shoe 12 so as to bias the rivet 25 against that edge of the hole 26 away from the other shoe 11. The spring 33 is located between the strut 22 and the back plate 13 and has a tang 39 located behind the web which then passes through to the front of that web, via an aperture 31 therein, and is then bent back on itself towards the other brake shoe 11 so as to form a spring biassing the strut 22 so that the largest diameter portion 29 abuts the web 16.

In normal service conditions, the spring bias exerted by the tang 39 keeps the medium diameter portion 28 engaged in the hole 26 and the clearance around that portion 28 provides the normal service clearance for the linings. The smallest diameter portion 27 is moved into engagement with the hole 26 against the bias of the spring tang 39, and this increases the lost motion clearance between the strut 22 and the shoe 12 and provides a greater clearance for the linings 19 and 20 thus enabling the drums to be removed for brake maintenance.

The friction device 24 at the other end of the strut is fitted to the web 15 of the other brake shoe 11. The friction device 24 comprises, a pin 34 slideably fitted into a brushed hole 42 in web 15 and a spring 35 located on the side of the web adjacent the back plate 13 acts against a head 40 on the pin to bias the pin 34 towards the back plate. On the other side of the web 15, away from the back plate, the pin 34 carries a sandwich of two friction washers 36 and secured thereon by a supporting washer and a nut 38. The nut 38 acts to transfer the load in the spring 35 to the washers. The hole 42 in the web 15 is substantially the same dimensions as the clearance hole in the shoe 12 such that the shoes 11 and 12 will be interchangeable if so required.

The strut 22 has a forked other end portion which is inserted between the two friction washers 36 so that the legs 32 of the forked portion lie one each side of the pin 34 and are gripped by the spring loaded washers 36. The spring 35 acting on the washers must have sufficient bias, for example 20 kgm (40 lb.), to enable the friction device to hold its position on the strut 22 so that when the brakes are operated the friction device pulls the strut 22 against the load, 7 kg (15 lb.), exerted by the spring 33 so as to take up the lost motion clearance between the strut 22 and the shoe 12.

A pull off spring 46 acts between the webs 15 and 16 at the other pair of adjacent end portions of the shoes 11 and 12 respectively that pivot on the abutment 18, so as to pull the shoes onto the abutment 18 and away from drums when the brakes are released.

When the brakes are applied, if the total clearances between the linings and the drum is equal to or less than the lost motion clearance of the main lost motion link then the brakes are applied and released without any adjustment.

When the total clearances exceed the main lost motion connection clearance then the operation of the brakes moving the shoes 11 and 12 apart, causes the strut 22 held by the friction grip device 24, to move with the other brake shoe 11 and take up the main lost motion connection clearance so that the rivet 25 abuts that edge of the hole 26 nearest the other shoe 11. To take up any excess clearance between the linings and the drum, the hydraulic cylinder pushes the shoes 11 and 12 further apart and since the one end of the strut is enclosed by the rivet 25 this will move the shoe 11 in the direction of arrow A relative to the strut 22 against the load exerted by the friction grip device 24, and thereby increase the effective length of the strut 22.

When the brakes are released the pull off spring 46 and the spring 33, pull the linings away from the drum. The adjacent one end portions of the shoes near the hydraulic cylinder 17 move together under the bias of spring 33 and the rivet 25 is returned against that edge of the hole 26 away from the other brake shoe 11. The friction device 25 then holds the shoe 11 relative to the strut 22 since there is no further load biassing the one ends of the shoes 11 and 12 together.

In order to service the brakes it is sometimes very difficult with automatically adjusted brakes to remove the drum because of small clearance between the linings 19 and 20 and the internal surface of the drum and also due to scouring of the drum. The brake, therefore, has to be de-adjusted; that is the overall effective length of the strut 22 has to be reduced sufficiently to increase clearances between the lining 19 and 20 and the drum allowing it to be removed easily.

In order to facilitate de-adjustment an aperture 41 is provided in the back plate 13, and aligns with the rivet 25 projecting through the web 16 of the brake shoe 12. A screwdriver can be inserted through the aperture 41 and pressed against the head 30 of the rivet 25 to lift the strut 22 against the bias of the spring tang 39 and move the smaller diameter portion 27 of the rivet into engagement with the clearance hole 26 in the web. This, as previously explained, increases the lost motion clearance between the strut and the one brake shoe 11 and, therefore, reduces the overall effective length of the strut 22.

I claim:

1. An internal shoe drum brake assembly including:
a pair of brake shoes each having a web thereon;
a strut acting between the shoes and having a variable overall effective length for automatic adjustment of clearance between the brake shoes and the brake drum when the brakes are released;
a first lost motion connection means whereby one end of the strut is connected to the web of one brake shoe and which provides a minimum clearance between the brake shoes and the drum;
and a de-adjusting means associated with said first lost motion means and whereby said minimum clearance can be increased,
and said de-adjusting means comprises a second lost motion connection having a greater clearance than said first connection means;
and a first spring acting perpendicularly to the web of the one brake shoe to bias the strut towards said web so that for normal service conditions the strut is connected to said one shoe by the first lost motion connection, and the bias of this spring must be overcome by manual operative means insertable through a hole defined in the drum brake assembly, during servicing of the brake, before the strut is connected to said one shoe by the de-adjusting means.

2. An internal shoe drum brake as claimed in claim 1, wherein the hole through which the manual operative means is insertable is defined in the drum brake back plate.

3. An internal shoe drum brake as claimed in claim 1, wherein the first lost motion connection means and the de-adjusting means associated therewith comprise different diameter portions of a stepped rivet and are respectively the larger and smaller diameter portions thereof, said rivet being attached to one of the strut and web; and a clearance hole in the other of the web and strut in which the rivet is engageable.

4. An internal shoe drum brake as claimed in claim 3, wherein the rivet is secured on the strut and the clearance hole is in the web of the one brake shoe.

5. An internal shoe drum brake as claimed in any one of claims 3 and 4, wherein a friction grip device connects the other end portion of the strut to the other brake shoe, and a pull off spring acts between the one brake shoe and the strut so as to bias the strut towards the one brake shoe without acting through the friction grip device.

6. An internal shoe drum brake as claimed in claim 5, wherein said first spring is formed from a portion of the tang of the pull off spring.

7. An internal shoe drum brake as claimed in claim 5, wherein the friction grip device comprises a resiliently load pin having friction washers thereon and being slidable in a hole in the web of the other brake shoe, said hole in the other brake shoe being of substantially the same dimensions as the clearance hole in the one brake shoe.

* * * * *